US009250125B2

(12) United States Patent
Kitade

(10) Patent No.: US 9,250,125 B2
(45) Date of Patent: Feb. 2, 2016

(54) OPTICAL SENSOR FOR USE WITH OUTPUT CIRCUIT THAT CORRECTS A SENSITIVITY DIFFERENCE BETWEEN FILTER FOR HIGH SENSITIVITY AND LOW SENSITIVITY PHOTODIODES

(71) Applicant: Rohm Co., Ltd., Kyoto (JP)

(72) Inventor: Tetsuya Kitade, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 179 days.

(21) Appl. No.: 13/834,735

(22) Filed: Mar. 15, 2013

(65) Prior Publication Data
US 2013/0256513 A1  Oct. 3, 2013

(30) Foreign Application Priority Data

Mar. 19, 2012  (JP) ................... 2012-61548

(51) Int. Cl.
 *G01J 1/44* (2006.01)
 *G01J 1/16* (2006.01)
 *G01J 1/42* (2006.01)
 *G01J 1/04* (2006.01)
(52) U.S. Cl.
 CPC ............... *G01J 1/44* (2013.01); *G01J 1/1626* (2013.01); *G01J 1/429* (2013.01); *G01J 1/4228* (2013.01); *G01J 1/0488* (2013.01)
(58) Field of Classification Search
 CPC ......... G01J 1/44; G01J 1/4228; G01J 1/0488; G01J 1/1626; G01J 1/429; G01J 1/0295; G01J 2001/1663; G01J 3/51; G01J 3/513; G01J 3/36; G01S 3/784; G01S 3/783; H01L 27/14621; H01L 27/1443
 USPC ............ 250/208.2, 208.1, 214 R, 214.1, 226; 327/514, 515
 See application file for complete search history.

(56) References Cited

U.S. PATENT DOCUMENTS

| 7,604,360 B2 * | 10/2009 | Chen et al. ................... 362/5 |
| 2007/0194217 A1 * | 8/2007 | Takiba et al. ............... 250/226 |
| 2011/0260629 A1 * | 10/2011 | Uedaira et al. ............. 315/158 |

FOREIGN PATENT DOCUMENTS

| JP | 2005-317994 | 11/2005 |
| JP | 2007-067331 | 3/2007 |

* cited by examiner

*Primary Examiner* — Georgia Y Epps
*Assistant Examiner* — Carolynn A Moore
(74) *Attorney, Agent, or Firm* — Fish & Richardson P.C.

(57) ABSTRACT

An optical sensor is provided according to an embodiment of the present disclosure. The optical sensor includes a first photodiode, a second photodiode having characteristics different from characteristics of the first photodiode, filters configured to block or transmit a specific wavelength range of the light, and an output circuit configured to correct a sensitivity deviation, which may be caused when one of the filters is used for the first photodiode, based on a sensitivity deviation, which may be caused when the other filter of the same kind as the one filter is used for the second photodiode, and output only the specific wavelength range of the light.

10 Claims, 19 Drawing Sheets

|  | First UV cut filter f1a | | Second UV cut filter f1b | |
|---|---|---|---|---|
|  | Filter absence | Filter presence | Filter absence | Filter presence |
| Aspect ratio | 1.000 | 0.957 | 0.600 | 0.569 |

OPTICAL SENSOR FOR USE WITH OUTPUT CIRCUIT THAT CORRECTS A SENSITIVITY DIFFERENCE BETWEEN FILTER FOR HIGH SENSITIVITY AND LOW SENSITIVITY PHOTODIODES

CROSS-REFERENCE TO RELATED APPLICATION

This application is based upon and claims the benefit of priority from Japanese Patent Application No. 2012-61548, filed on Mar. 19, 2012, the entire contents of which are incorporated herein by reference.

TECHNICAL FIELD

The present disclosure relates to an optical sensor and an output circuit thereof.

BACKGROUND

There have been conventionally proposed techniques for extracting a specific wavelength range of light from sunlight. For example, an ultraviolet sensor is capable of receiving ultraviolet light and outputting photoelectric current. In addition, a semiconductor light receiving element is capable of detecting the intensity of only visible light among received light.

However, such conventional techniques could not precisely extract desired light due to a sensitivity deviation which may be caused by ringing of spectral sensitivity of a filter transmittance.

For example, an UV cut filter and two photodiodes may be used to extract an UV wavelength range R1 of the light as shown in FIG. 21B from sunlight as shown in FIG. 21A. In this case, in order to extract the UV wavelength range R1 of the light, there is a need to subtract the "output from a photodiode A1 provided with no filter" as shown in FIG. 22B from the "output from a photodiode A2 provided with a filter" as shown in FIG. 22A. However, for example, when the UV cut filter is attached to the photodiode A2, ringing in a spectral sensitivity of a filter transmittance occurs while light other than ultraviolet light can be transmitted, as shown in FIG. 23A. The ringing occurs due to an interference between reflected waves at a surface and a lower portion of the filter, as shown in FIG. 23B. If ringing in the output of the photodiode A2 occurs as shown in FIG. 22B, the output of the photodiode A1−output of the photodiode A2 will include some remaining light in a wavelength range other than the UV wavelength range R1, which may result in a sensitivity deviation, as shown in FIG. 22C. Thus, the conventional techniques have a problem in that the sensitivity deviation increased as the manufacture tolerance of filters has a direct effect when the output of the photodiode A2 is subtracted from the output of the photodiode A1 (i.e., output of a first photodiode A1−output of a third photodiode A2).

SUMMARY

The present disclosure provides some embodiments of an optical sensor and an output circuit thereof, which are capable of achieving high precision by reducing a sensitivity deviation due to ringing.

According to one embodiment of the present disclosure, there is provided an optical sensor including: a first photodiode; a second photodiode having characteristics different from characteristics of the first photodiode; filters configured to block or transmit a specific wavelength range of the light; and an output circuit configured to correct a sensitivity deviation, which may be caused when one of the filters is used for the first photodiode, based on a sensitivity deviation, which may be caused when the other filter of the same kind as the one filter is used for the second photodiode, and outputs only the specific wavelength range of the light.

According to another embodiment of the present disclosure, there is provided an optical sensor including: a first photodiode; a second photodiode having characteristics different from characteristics of the first photodiode; first and second cut filters configured to block a specific wavelength range of the light; a third photodiode which is configured to include the same configuration as the first photodiode and includes the first cut filter formed on a light receiving surface of the third photodiode; a fourth photodiode which is configured to include the same configuration as the second photodiode and includes the second cut filter formed on a light receiving surface of the fourth photodiode; and an output circuit which calculates an equation of [(output of the first photodiode−output of the third photodiode)−(output of the second photodiode−output of the fourth photodiode)].

According to another embodiment of the present disclosure, there is provided an optical sensor including: a fifth photodiode including a first transmission filter formed on a light receiving surface of the fifth photodiode; a sixth photodiode including a second transmission filter formed on a light receiving surface of the sixth photodiode; and an output circuit which calculates an equation of (output of the fifth photodiode−output of the sixth photodiode), wherein the first and second transmission filters are configured to transmit a specific wavelength range of the light and the sixth photodiode has characteristics different from characteristics of the fifth photodiode.

According to another embodiment of the present disclosure, there is provided an output circuit including: an arithmetic circuit configured to perform a calculation to correct a sensitivity deviation, which may be caused when one of filters which block or transmit a specific wavelength range of the light is used for a first photodiode, based on a sensitivity deviation, which may be caused when the other filter of the same kind as the one filter is used for a second photodiode having characteristics different from characteristics of the first photodiode; a conversion circuit configured to convert an analog signal from the arithmetic circuit into a digital signal; and a logic circuit which subjects the digital signal from the conversion circuit to a predetermined calculation process.

According to another embodiment of the present disclosure, there is provided an output circuit including: an arithmetic circuit which is connected to a first photodiode, a second photodiode having characteristics different from characteristics of the first photodiode, first and second cut filters configured to block a specific wavelength range of the light, a third photodiode having the same configuration as the first photodiode and including the first cut filter formed on a light receiving surface the third photodiode, and a fourth photodiode having the same configuration as the second photodiode and including the second cut filter formed on a light receiving surface of the fourth photodiode and calculates an equation of [(output of the first photodiode−output of the third photodiode)−(output of the second photodiode−output of the fourth photodiode)]; a conversion circuit configured to convert an analog signal from the arithmetic circuit into a digital signal; and a logic circuit configured to subject the digital signal from the conversion circuit to a predetermined calculation process.

According to another embodiment of the present disclosure, there is provided an output circuit including: an arithmetic circuit which is connected to a fifth photodiode including a first transmission filter formed on a light receiving surface the fifth photodiode, and a sixth photodiode including a second transmission filter formed on a light receiving surface of the sixth photodiode and calculates an equation of (output of the fifth photodiode−output of the sixth photodiode); a conversion circuit configured to convert an analog signal from the arithmetic circuit into a digital signal; and a logic circuit configured to subject the digital signal from the conversion circuit to a predetermined calculation process, wherein the first and second transmission filters are configured to transmit a specific wavelength range of the light and the sixth photodiode has characteristics different from characteristics of the fifth photodiode.

According to another embodiment of the present disclosure, there is provided an output circuit including: a first conversion circuit configured to convert an analog signal into a digital signal; a second conversion circuit configured to convert an analog signal into a digital signal; and a logic circuit configured to perform a calculation to correct a sensitivity deviation, which may be caused when one of filters which block or transmit a specific wavelength range of the light is used for a first photodiode, based on a sensitivity deviation, which may be caused when the other filter of the same kind as the one filter is used for a second photodiode having characteristics different from characteristics of the first photodiode by subjecting the digital signals from the first and second conversion circuits to a predetermined calculation process.

According to another embodiment of the present disclosure, there is provided an output circuit including: a first conversion circuit which is connected to a first photodiode, a second photodiode having characteristics different from characteristics of the first photodiode, first and second cut filters configured to block a specific wavelength range of the light, a third photodiode having the same configuration as the first photodiode and including the first cut filter formed on a light receiving surface the third photodiode, and a fourth photodiode having the same configuration as the second photodiode and including the second cut filter formed on a light receiving surface of the fourth photodiode and converts an equation of [(output of the first photodiode−output of the third photodiode)+(output of the fourth photodiode+output of the second photodiode)] from an analog signal into a digital signal; a second conversion circuit which is connected to the second photodiode and converts an equation of (output of the second photodiode+output of the second photodiode) from an analog signal into a digital signal; and a logic circuit which calculates an equation of [(output of the first photodiode−output of the third photodiode)−(output of the second photodiode−output of the fourth photodiode)] by subjecting the digital signals from the first and second conversion circuits to a predetermined calculation process.

BRIEF DESCRIPTION OF THE DRAWINGS

FIG. 20B shows extraction of current $I_{A2}$, FIG. 20C showing extraction of current $I_{A1}+I_{B1}$, and FIG. 20D shows extraction of current $I_{B1}$.

DETAILED DESCRIPTION

Figure 1:
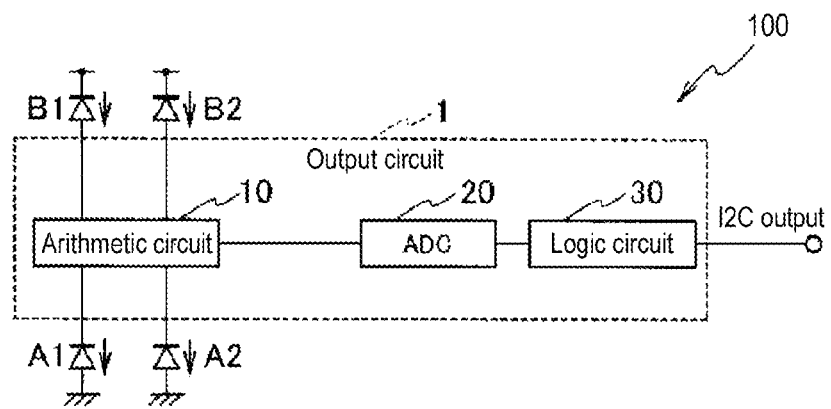
FIG. 1 is a schematic block diagram showing an example of a configuration of an optical sensor according to a first embodiment.

Embodiments of the present disclosure will hereinafter be described with reference to the drawings. In the drawings, the same or similar elements are denoted by the same or similar reference numerals. It is however noted that figures in the drawings are just schematic and a relationship between thickness and dimension of elements, a thickness ratio of layers and so on may be drawn opposed to the reality. Therefore, details of the thickness and dimension should be determined based on the following detailed description. In addition, it is to be understood that different figures in the drawings may have different dimension relationships and ratios.

The following embodiments provide devices and methods to embody the technical ideas of the present disclosure and material, shape, structure, arrangement and so on of elements in the disclosed embodiments are not limited to those specified in the following description. Various modifications to the embodiments of the present disclosure may be made without departing from the spirit and scope of the present disclosure which are defined by the claims.

First Embodiment

An optical sensor according to a first embodiment will now be described with reference to FIGS. 1 to 12.

FIG. 1 is a schematic block diagram showing an example of a configuration of an optical sensor 100 according to a first embodiment. As shown in FIG. 1, the optical sensor 100 according to the first embodiment includes a first photodiode A1, a second photodiode B1 having characteristics different from those of the first photodiode A1, a third photodiode A2 having the same configuration as the first photodiode A1 and including a first UV cut filter f1a (see FIG. 2) formed on its light receiving surface, and a fourth photodiode B2 having the same configuration as the second photodiode B1 and including a second UV cut filter f1b (see FIG. 2) formed on its light receiving surface. The first and second UV cut filters f1a and f1b are provided to block an UV wavelength range R1 of the light. The optical sensor 100 further includes an output circuit 1 for correcting a sensitivity deviation, which may be caused when the first UV cut filter f1a is used for the first photodiode A1, based on a sensitivity deviation, which may be caused when the second UV cut filter f1b is used for the second photodiode B1, and outputting the UV wavelength range R1 of the light.

More specifically, the optical sensor 100 includes the first photodiode A1, the second photodiode B1 having characteristics different from those of the first photodiode A1, the first and second UV cut filters f1a and f1b for blocking an UV wavelength range R1 of the light, the third photodiode A2 having the same configuration as the first photodiode A1 and including the first UV cut filter f1a formed on its light receiving surface, the fourth photodiode B2 having the same configuration as the second photodiode B1 and including the second UV cut filter f1b formed on its light receiving surface, and the output circuit 1 for calculating a value of [(output of the first photodiode A1−output of the third photodiode A2)−(output of the second photodiode B1−output of the fourth photodiode B2)].

In addition, when the value of [(output of the first photodiode A1−output of the third photodiode A2)−(output of the second photodiode B1−output of the fourth photodiode B2)] is calculated, areas of the first to fourth photodiodes A1, A2, B1 and B2 may be adjusted in advance such that a value of current in a wavelength range other than the UV wavelength range R1 becomes zero.

In addition, when the value of [(output of the first photodiode A1−output of the third photodiode A2)−(output of the second photodiode B1−output of the fourth photodiode B2)] is calculated, a calculating method in the output circuit 1 may be adjusted in advance such that a value of current in a wavelength range other than the UV wavelength range R1 becomes zero.

In addition, the first photodiode A1 may be a photodiode having higher sensitivity of the UV wavelength range R1 and the second photodiode B1 may be a photodiode having lower sensitivity of the UV wavelength range R1.

(Example of Layout of Optical Sensor)

Figure 2:
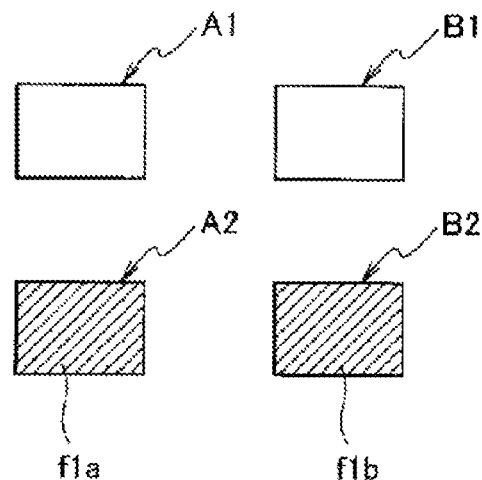
FIG. 2 is a schematic plan view showing an example of a layout of photodiodes of the optical sensor according to the first embodiment.

FIG. 2 is a schematic plan view showing an example of a layout of the photodiodes A1, A2, B1 and B2 of the optical sensor 100 according to the first embodiment. The optical sensor 100 is configured to extract only the UV light using the two UV cut filters f1a and f1b and the four photodiodes A1, A2, B1 and B2.

The first and second UV cut filters f1a and f1b blocks the UV wavelength range R1 of the light. The first UV cut filter f1a is configured to include the same sectional structure as the second UV cut filter f1b, but they may have different areas.

The first photodiode A1 is a photodiode having a higher sensitivity of the UV wavelength range R1 of the light. The third photodiode A2 is configured to include the same configuration as the first photodiode A1, and includes the first UV cut filter f1a formed on its light receiving surface. The second photodiode B1 is a photodiode having a lower sensitivity of the UV wavelength range R1 of the light. The fourth photodiode B2 is configured to include the same configuration as the second photodiode B1, and includes the second UV cut filter f1b formed on its light receiving surface.

As used herein, the phrase "the third photodiode A2 has the same configuration as the first photodiode A1" means that the third photodiode A2 is configured to include the same sectional structure in a junction depth direction as the first photodiode A1. The first and third photodiodes A1 and A2 may have different areas.

As used herein, the phrase "the fourth photodiode B2 has the same configuration as the second photodiode B1" means that the fourth photodiode B2 is configured to include the same sectional structure in a junction depth direction as the second photodiode B1. The second and fourth photodiodes B1 and B2 may have different areas.

(Operation of Optical Sensor)

Figure 3A:
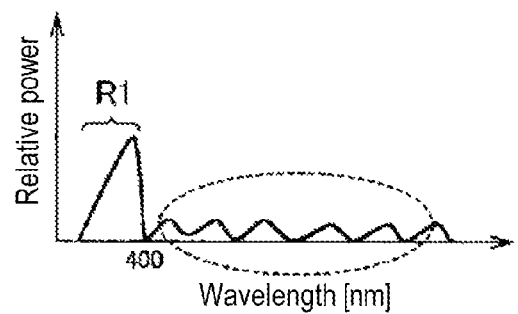
FIGS. 3A to 3E are graphical views showing the concept of an operation of an optical sensor according to a first embodiment, FIG. 3A showing a graph when an output of a third photodiode A2 is subtracted from an output of a first photodiode A1 (i.e., output of a first photodiode A1−output of a third photodiode A2), FIG. 3B showing a graph of the output of a second photodiode B1, FIG. 3C showing a graph of the output of a fourth photodiode B2, FIG. 3D showing a graph when an output of a fourth photodiode B2 is subtracted from an output of a second photodiode B1 (i.e., output of the second photodiode B1−output of the fourth photodiode B2), and FIG. 3E showing a graph when the output from FIG. 3D is subtracted from the output from FIG. 3A [i.e., (output of the first photodiode A1−output of the third photodiode A2)−(output of the second photodiode B1−output of the fourth photodiode B2)].
Figure 3B:
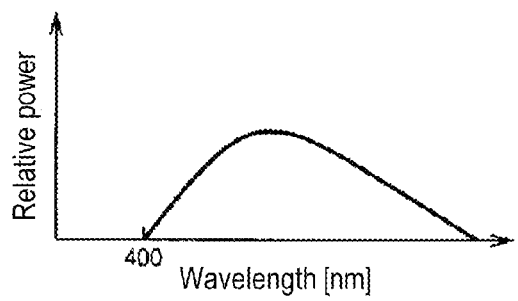
Figure 3C:
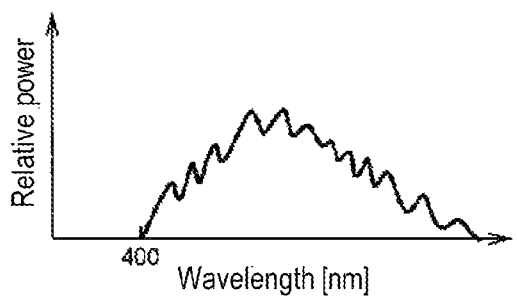
Figure 3D:
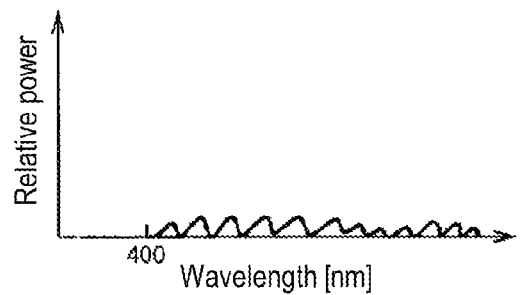
Figure 3E:
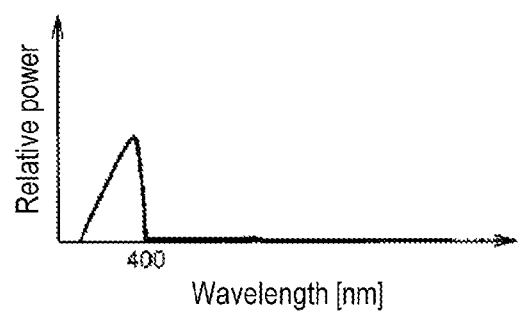

FIGS. 3A to 3E are graphical views showing the concept of the operation of the optical sensor 100 according to the first embodiment. FIG. 3A shows a graph when the output of the third photodiode A2 is subtracted from the output of the first photodiode A1 (i.e., output of the first photodiode A1–output of the third photodiode A2). As described previously, the first photodiode A1 is a photodiode having higher sensitivity of the UV wavelength range R1 of the light. The third photodiode A2 has the same configuration as the first photodiode A1, and includes the first UV cut filter f1a formed on its light receiving surface. As indicated by the broken lines in FIG. 3A, the sensitivity deviation caused by the first UV cut filter f1a occurs in a wavelength range other than the UV wavelength range R1 to be extracted. FIG. 3B shows a graph of the output of the second photodiode B1. As described previously, the second photodiode B1 is a photodiode having lower sensitivity of the UV wavelength range R1. FIG. 3C shows a graph of the output of the fourth photodiode B2. The fourth photodiode B2 has the same configuration as the second photodiode B1, and includes the second UV cut filter f1b formed on its light receiving surface. FIG. 3D shows a graph when an output of a fourth photodiode B2 is subtracted from an output of a second photodiode B1 (i.e., output of the second photodiode B1–output of the fourth photodiode B2). FIG. 3E shows a graph when a result of calculation in FIG. 3D is subtracted from a result of calculation in FIG. 3A. That is, FIG. 3E shows [(output of the first photodiode A1–output of the third photodiode A2)–(output of the second photodiode B1–output of the fourth photodiode B2)]. As shown in FIG. 3E, when all of the outputs of the four photodiodes A1, A2, B1 and B2 are used to obtain an output of the optical sensor 100, a sensitivity deviation caused by ringing of spectral sensitivity of a filter transmittance can be reduced, thereby achieving a high precision.

(Example of Configuration of Output Circuit)

Figure 4:
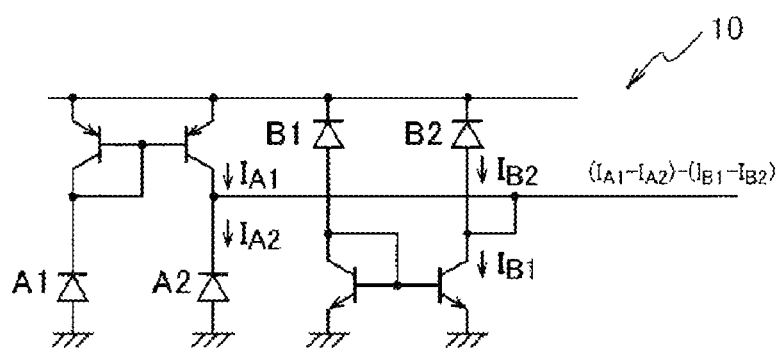
FIG. 4 is a schematic circuit diagram showing an example of an internal configuration of an arithmetic circuit according to the first embodiment.

With reference to FIG. 1, an example of a configuration of the output circuit 1 according to the first embodiment will be described. The output circuit 1 is configured to subject the outputs of the four photodiodes A1, A2, B1 and B2 to a predetermined process, and output a result of the process using a communication system such as I2C (Inter-Integrated Circuit) or any other system that is suitable for outputting the result. More specifically, as shown in FIG. 1, the output circuit 1 includes an arithmetic circuit 10, an ADC 20 and a logic circuit 30. The arithmetic circuit 10 is configured to perform a calculation for correcting a sensitivity deviation, which may be caused when the first UV cut filter f1a is used for the first photodiode A1, based on a sensitivity deviation, which may be caused when the second UV cut filter f1b is used for the second photodiode B1. More specifically, the arithmetic circuit 10 calculates a value of [(output of the first photodiode A1–output of the third photodiode A2)–(output of the second photodiode B1–output of the fourth photodiode B2)]. FIG. 4 shows an example of an internal configuration of the arithmetic circuit 10. The internal configuration of the arithmetic circuit 10 is not limited to that shown in FIG. 4. The ADC 20 converts an analog signal from the arithmetic circuit 10 into a digital signal. The logic circuit 30 subjects the digital signal from the ADC 20 to a predetermined calculation process.

(Example of UV Light Output)

Figure 5A:
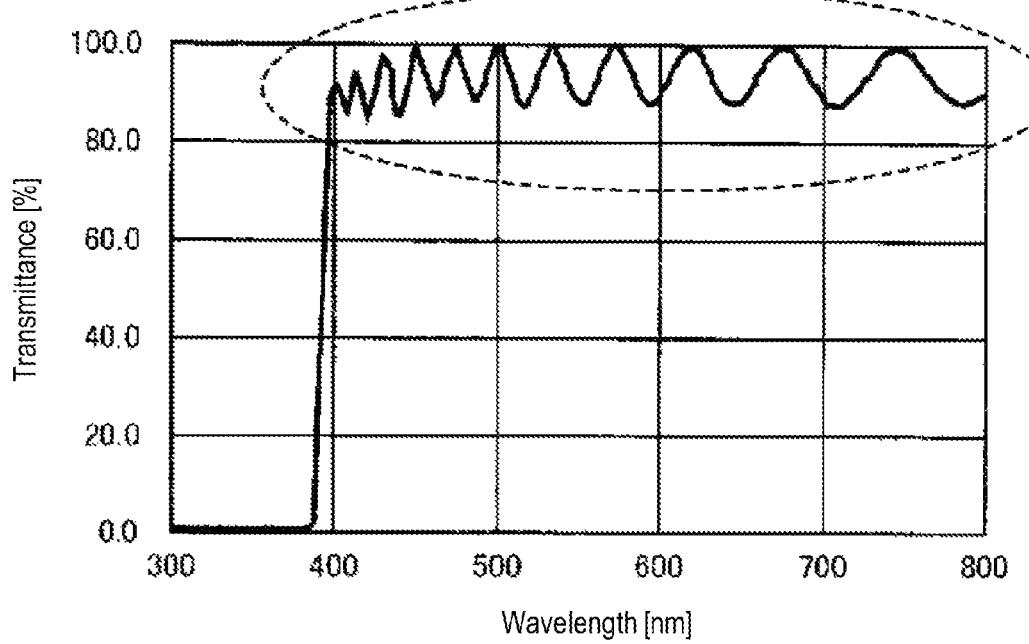
FIGS. 5A and 5B are graphical views used to explain an example of UV light output according to the first embodiment, FIG. 5A showing characteristics of first and second UV cut filters and FIG. 5B showing a sunlight spectrum.
Figure 5B:
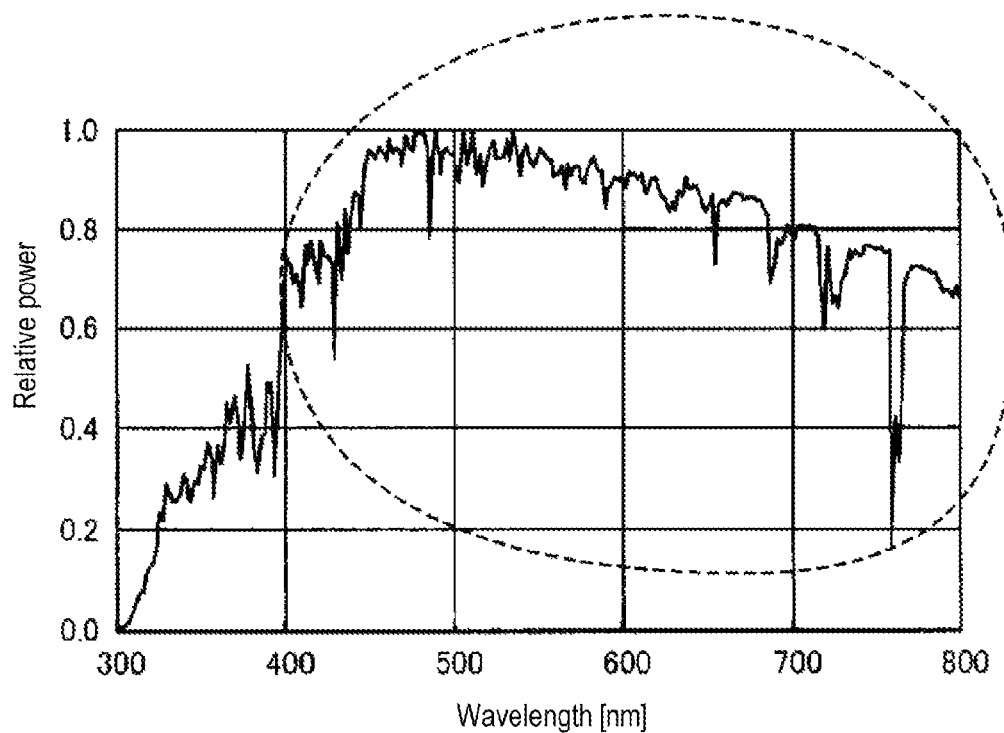

FIG. 5A is a graphical view showing characteristics of the first and second UV cut filters f1a and f1b. Each of the first and second UV cut filters f1a and f1b is a multi-layered filter for blocking the UV wavelength range R1 of the light. As indicated by the broken lines in FIG. 5A, a visible wavelength range may contain an unblocked error component due to ringing in the first and second UV cut filters f1a and f1b. FIG. 5B shows a sunlight spectrum in which relative power of visible light (380 nm to 780 nm) is greatly larger than that of ultraviolet light (100 nm to 380 nm). As indicated by the broken lines in FIG. 5B, it can be seen that a peak of the visible light is higher than that of the UV light.

Figure 6A:
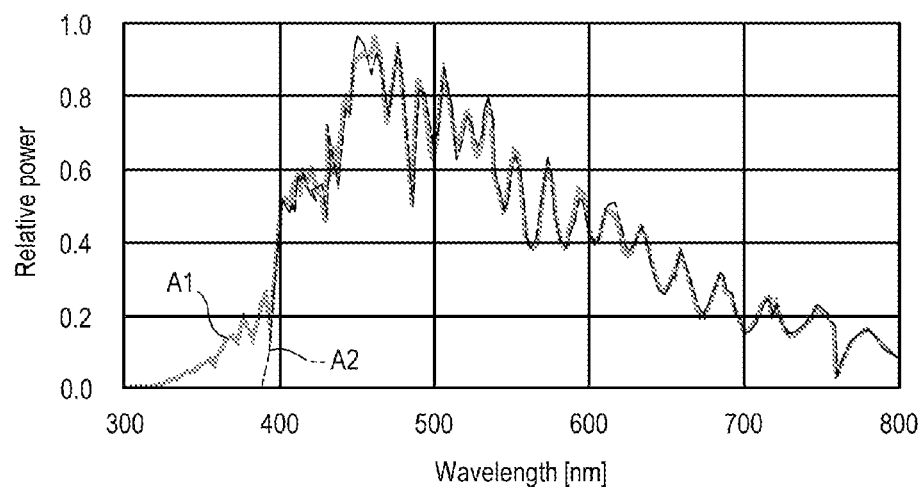
FIGS. 6A to 6E are graphical views used to explain an example of UV light output according to the first embodiment, FIG. 6A showing a graph of the output of a first photodiode A1 and the output of a third photodiode A2, FIG. 6B showing a graph when the output of the third photodiode A2 is subtracted from the output of the first photodiode A1 (i.e., output of a first photodiode A1−output of a third photodiode A2), FIG. 6C showing a graph of the output of the second photodiode B1 and output of the fourth photodiode B2, FIG. 6D showing a graph when an output of a fourth photodiode B2 is subtracted from an output of a second photodiode B1 (i.e., output of a second photodiode B1−output of a fourth photodiode B2), and FIG. 6E showing a graph when a result of calculation in FIG. 6D is subtracted from a result of calculation in FIG. 6B [i.e., (output of a first photodiode A1−output of a third photodiode A2)−(output of a second photodiode B1−output of a fourth photodiode B2)].
Figure 6B:
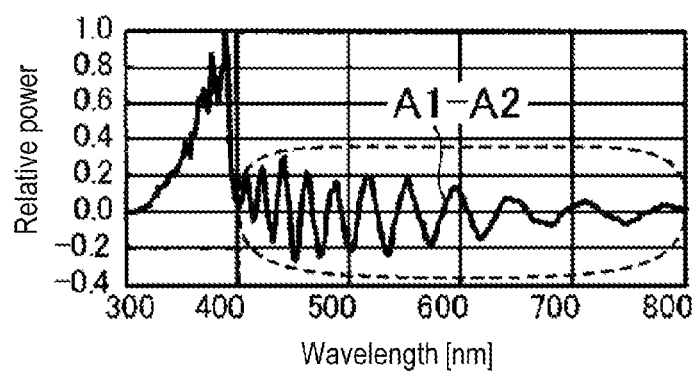
Figure 6C:
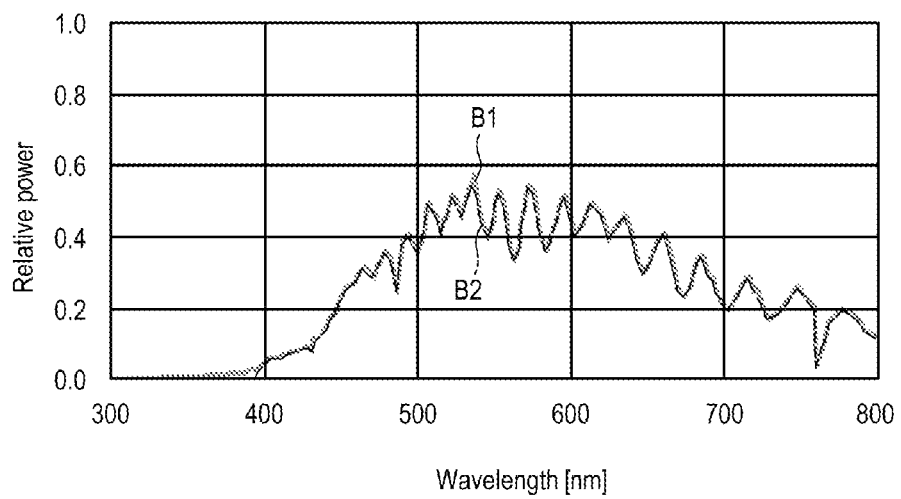
Figure 6D:
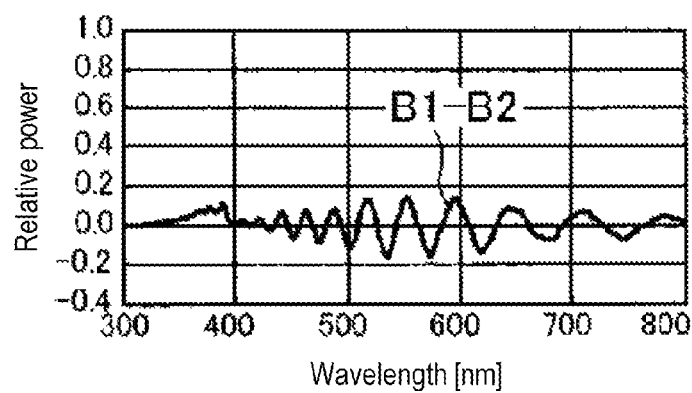
Figures 6E, 7:
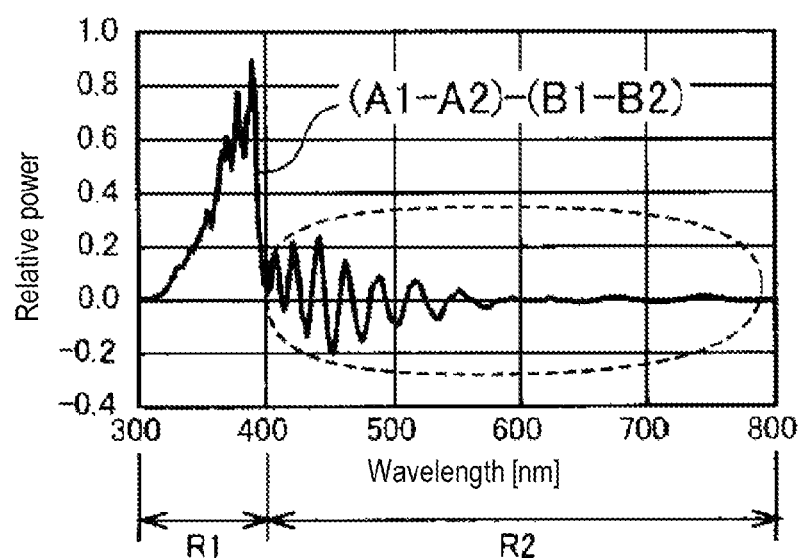
FIG. 7 is a view used to explain areas of photodiodes according to the first embodiment.

FIG. 6A shows a graph of the output of the first photodiode A1 and the output of the third photodiode A2. The first photodiode A1 is provided with no multi-layered filter and the third photodiode A2 is provided with the first UV cut filter f1a. FIG. 6B shows a graph when the output of the third photodiode A2 is subtracted from the output of the first photodiode A1 (i.e., output of the first photodiode A1–output of the third photodiode A2). FIG. 6C shows a graph of the output of the second photodiode B1 and output of the fourth photodiode B2. The second photodiode B1 is provided with no multi-layered filter and the fourth photodiode B2 is provided with the second UV cut filter f1b. FIG. 6D shows a graph when an output of a fourth photodiode B2 is subtracted from an output of a second photodiode B1 (i.e., output of the second photodiode B1–output of the fourth photodiode B2). FIG. 6E shows a graph when a result of calculation in FIG. 6D is subtracted from a result of calculation in FIG. 6B. That is, FIG. 6E shows [(output of the first photodiode A1–output of the third photodiode A2)–(output of the second photodiode B1–output of the fourth photodiode B2)]. From a comparison between ranges surrounded by broken lines in FIGS. 6B and 6E, it can be seen that ringing in the visible wavelength range R2 is reduced.

(Adjustment Process)

In this embodiment, when the value of [(output of the first photodiode A1–output of the third photodiode A2)–(output of the second photodiode B1–output of the fourth photodiode B2)] is calculated, an adjustment is made in advance such that a value of current in a wavelength range other than the UV wavelength range R1 becomes zero.

For example, areas of the photodiodes A1, A2, B1 and B2 are adjusted in advance. More specifically, as shown in FIG. 6E, junction areas of the photodiodes A1, A2, B1 and B2 are adjusted using a trimming method or the like such that an integral value of the visible wavelength range R2 becomes zero. FIG. 7 shows one example of a result of the adjustment. In this case, it is assumed that an aspect ratio of "filter absence" of the first UV cut filter f1a is 1.000. Further, it is appropriate that an aspect ratio of "filter presence" of the first UV cut filter f1a is set to 0.957, an aspect ratio of "filter absence" of the second UV cut filter f1b is set to 0.600 and an aspect ratio of "filter presence" of the second UV cut filter f1b is set to 0.569.

Alternatively, a calculation method in the output circuit 1 may be adjusted in advance. For example, values of the current output from the photodiodes A1, A2, B1 and B2 may be adjusted by adjusting a mirror ratio of a current mirror. The current values used herein refer to current values $I_{A1}$, $I_{A2}$, $I_{B1}$ and $I_{B2}$ shown in FIG. 4. When the current values $I_{A1}$, $I_{A2}$, $I_{B1}$ and $I_{B2}$ are adjusted in this manner, current values in a wavelength range other than the UV wavelength range R1 can be adjusted to become zero even if areas of the photodiodes A1, A2, B1 and B2 are equal to each other.

(Photodiode and Filter)

Figure 8:
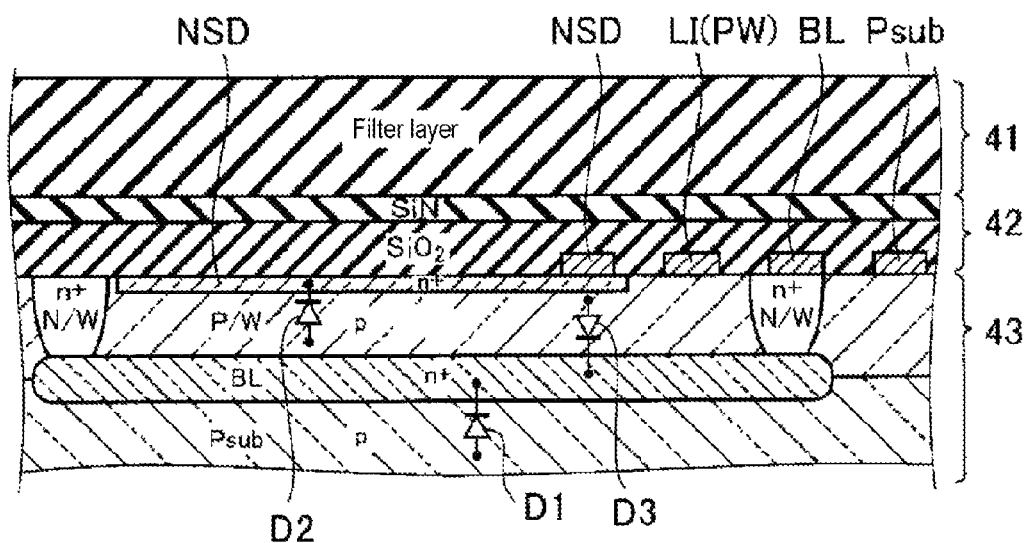
FIG. 8 is a schematic sectional view of photodiodes according to the first embodiment.
Figure 9:
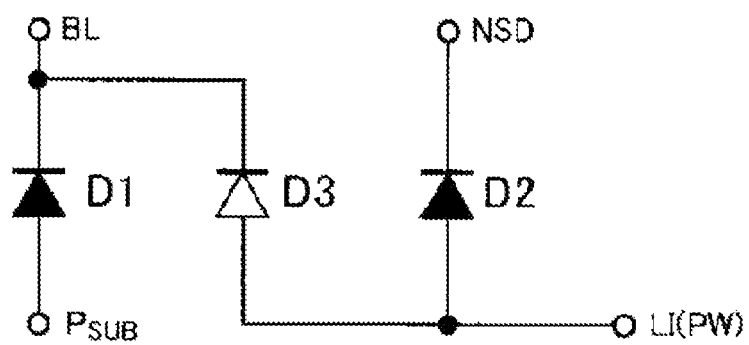
FIG. 9 is a schematic circuit diagram of the photodiodes according to the first embodiment.
Figure 10:
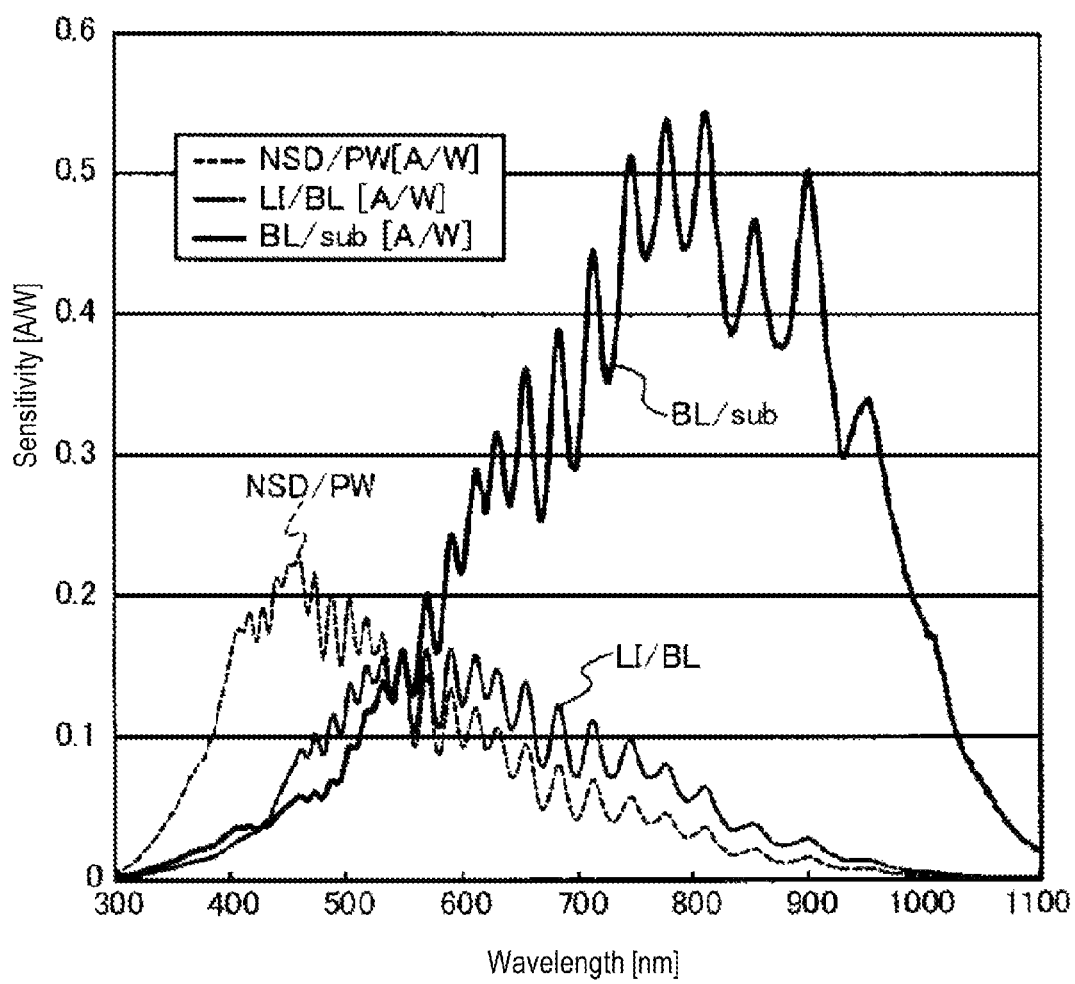
FIG. 10 is a graphical view showing characteristics of the photodiodes according to the first embodiment.

FIG. 8 is a schematic section view of photodiodes according to the first embodiment and FIG. 9 is an equivalent circuit diagram thereof. As shown in these figures, the photodiodes have three respective PN junctions BL/sub, BL/LI (PW) and NSD/PW having different characteristics. That is, as shown in FIG. 10, as it becomes closer to a surface, it is more likely to absorb light having a short wavelength. In FIGS. 8 and 9, BL/sub, NSD/PW and BL/LI indicate photodiodes D1, D2 and D3, respectively. This embodiment employs the first photodiode A1 having a higher sensitivity of the UV wavelength range R1 and the second photodiode B1 having a lower sensitivity of the UV wavelength range R1. The first photodiode A1 corresponds to the photodiode D2 and the second photodiode B1 corresponds to the photodiode D3.

Figure 11:
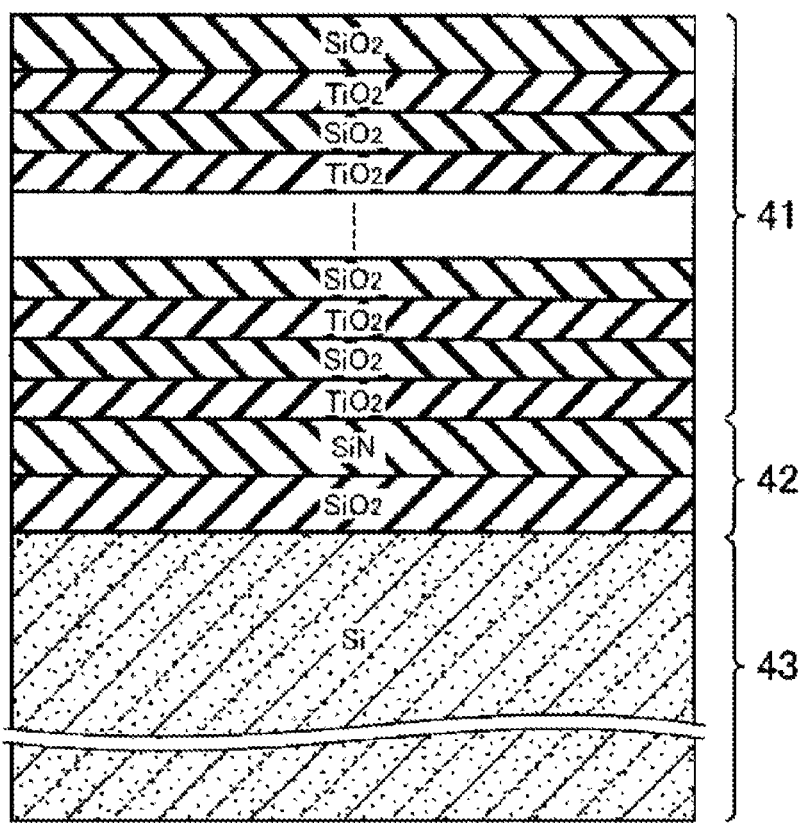
FIG. 11 is a schematic sectional view of a filter layer according to the first embodiment.
Figure 12:
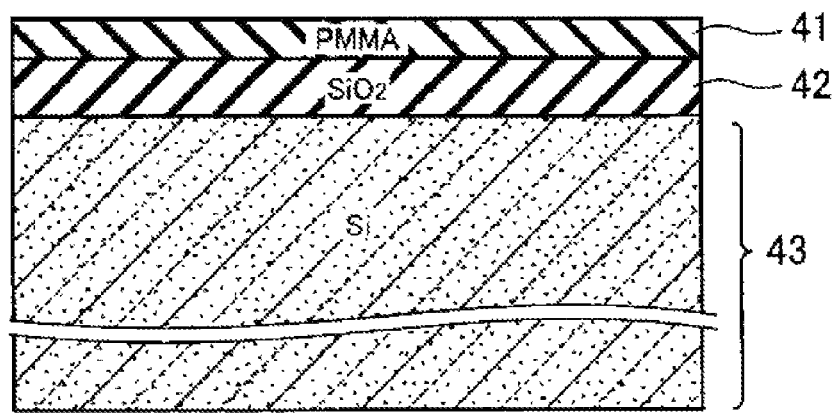
FIG. 12 is a schematic sectional view of another filter layer according to the first embodiment.

As shown in FIG. 8, a passivation layer 42 is formed on a photodiode structure 43 and a filter layer 41 is further formed on the passivation layer 42. For example, as shown in FIG. 11, the filter layer 41 is a multi-layered film including $SiO_2$ and $TiO_2$ repeatedly stacked in this order. Characteristics of the filter may be changed depending on the film thickness and the number of layers. Alternatively, as shown in FIG. 12, the filter layer 41 may be made of acryl-based resin (PMMA). The filter layer 41 may be configured in various ways without being particularly limited.

As described above, in this embodiment, [(output of the first photodiode A1–output of the third photodiode A2)–(output of the second photodiode B1–output of the fourth photodiode B2)] is calculated. In other words, a sensitivity deviation which may be caused when the first UV cut filter f1a is used for the first photodiode A1 is corrected based on a sensitivity deviation which may be caused when the second UV cut filter f1b is used for the second photodiode B1. Accordingly, since the sensitivity deviation caused by ringing can be reduced to achieve a high precision, the wavelength selectivity can be improved to obtain an output of a photodiode having sensitivity to only a specific wavelength of the light.

Second Embodiment

An optical sensor according to a second embodiment will now be described with reference to FIGS. 13 to 17 with an emphasis placed on differences from the first embodiment.

Figure 13:
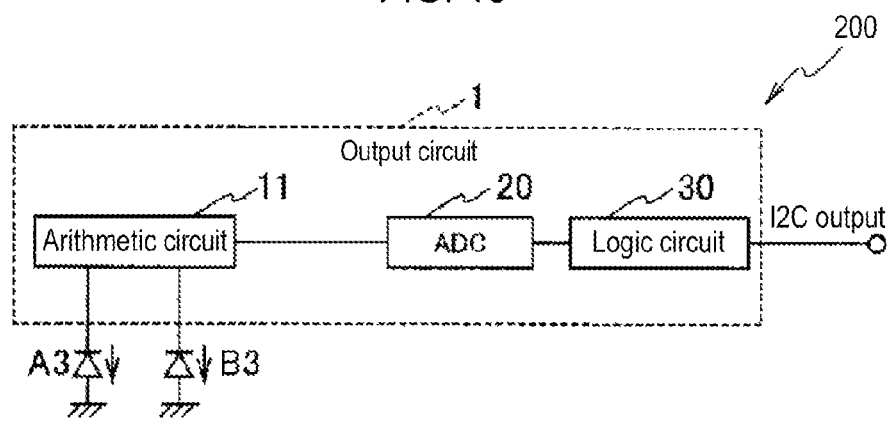
FIG. 13 is a schematic block diagram showing an example of a configuration of an optical sensor according to a second embodiment.

FIG. 13 is a schematic block diagram showing an example of a configuration of an optical sensor 200 according to the second embodiment. The optical sensor 200 according to the second embodiment has basically the same configuration as that of the first embodiment except that two photodiodes A3 and B3 are provided instead of the four photodiodes A1, A2, B1 and B2 in the first embodiment. An optical sensor 200 according to a second embodiment includes a fifth photodiode A3, a sixth photodiode B3 having characteristics different from those of the fifth photodiode A3, first and second UV transmission filters f2a and f2b for transmitting an UV wavelength range R1 of the light, and an output circuit 1 for correcting a sensitivity deviation, which may be caused when the first UV transmission filter f2a is used for the fifth photodiode A3, based on a sensitivity deviation, which may be caused when the second UV transmission filter f2b is used for the sixth photodiode B3. The output circuit 1 is further configured to output only the UV wavelength range R1 of the light.

More specifically, the optical sensor 200 includes the fifth photodiode A3 including the first UV transmission filter f2a formed on its light receiving surface, and the sixth photodiode B3 including the second UV transmission filter f2b formed on its light receiving surface, and the output circuit 1 for calculating a value of (output of the fifth photodiode A3–output of the sixth photodiode B3).

In addition, when the value of (output of the fifth photodiode A3–output of the sixth photodiode B3) is calculated, areas of the fifth and sixth photodiodes A3 and B3 may be adjusted in advance such that a value of current in a wavelength range other than the UV wavelength range R1 becomes zero.

In addition, when the value of (output of the fifth photodiode A3–output of the sixth photodiode B3) is calculated, a calculating method in the output circuit 1 may be adjusted in advance such that a value of current in a wavelength range other than the UV wavelength range R1 becomes zero.

(Example of Layout of Optical Sensor)

Figure 14:
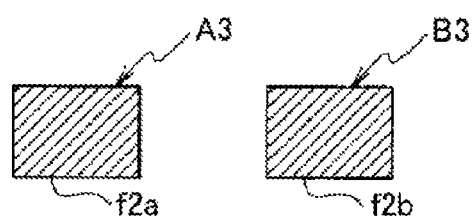
FIG. 14 is a schematic plan view showing an example of a layout of photodiodes of the optical sensor according to the second embodiment.
Figure 15:
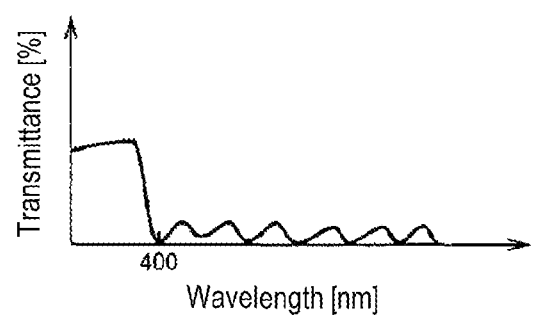
FIG. 15 is a graphical view showing characteristics of first and second UV transmission filters according to the second embodiment.

FIG. 14 is a schematic plan view showing an example of a layout of the photodiodes A3 and B3 of the optical sensor 200 according to the second embodiment. The optical sensor 200 is configured to extract only the UV light using the two UV transmission filters f2a and f2b and the two photodiodes A3 and B3. As shown in FIG. 15, the first and second UV transmission filters f2a and f2b are configured to transmit the UV wavelength range R1 of the light. The configuration of the first and second UV transmission filters f1a and f1b is not particularly limited. The first UV transmission filter f2a is configured to include the same sectional structure as the second UV transmission filter f2b but they may have different areas. The fifth photodiode A3 is configured to include the same configuration as the first photodiode A1 and includes the first UV transmission filter f2a formed on its light receiving surface. The sixth photodiode B3 is configured to include the same configuration as the second photodiode B1 and includes the second UV transmission filter f2b formed on its light receiving surface.

As used herein, the phrase "the fifth photodiode A3 has the same configuration as the first photodiode A1" means that the fifth photodiode A3 is configured to include the same sectional structure in junction depth direction as the first photodiode A1. The first and fifth photodiodes A1 and A3 may have different areas.

As used herein, the phrase "the sixth photodiode B3 has the same configuration as the second photodiode B1" means that the sixth photodiode B3 is configured to include the same sectional structure in junction depth direction as the second photodiode B1. The second and sixth photodiodes B1 and B3 may have different areas.

(Example of Configuration of Output Circuit)

Figure 16:
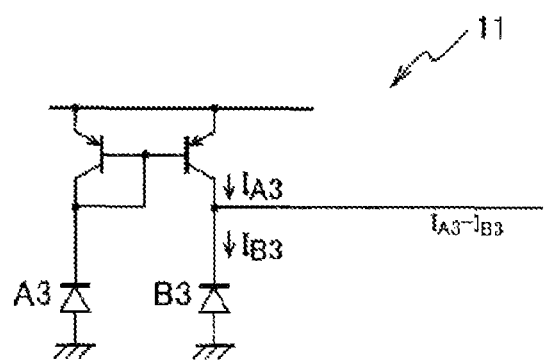
FIG. 16 is a schematic circuit diagram showing an example of an internal configuration of an arithmetic circuit according to the second embodiment.

Based on FIG. 13, an example of a configuration of the output circuit 1 according to the second embodiment will be described. The output circuit 1 according to the second embodiment has basically the same configuration as that of the first embodiment except that a process object is changed from outputs of the four photodiodes A1, A2, B1 and B2 to outputs of the two photodiodes A3 and B3. That is, the output circuit 1 is configured to subject the outputs of the two photodiodes A3 and B3 to a predetermined process, and output a result of the process using a communication system such as I2C or the like. More specifically, as shown in FIG. 13, the output circuit 1 includes an arithmetic circuit 11, an ADC 20 and a logic circuit 30. The arithmetic circuit 11 calculates a value of (output of the fifth photodiode A3–output of the sixth photodiode B3) and passes a result of the calculation over the ADC 20. FIG. 16 shows an example of an internal configuration of the arithmetic circuit 11. Other configurations are the same as the first embodiment and detailed explanation of which is not repeated.

(Example of UV Light Output)

Figure 17A:
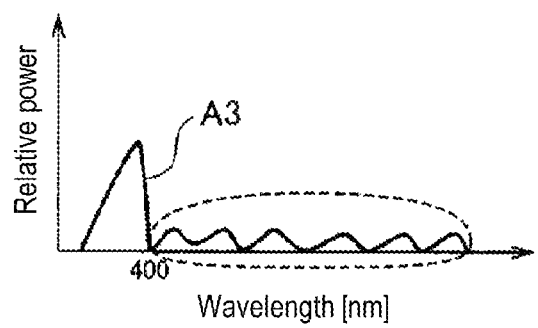
FIGS. 17A to 17C are graphical views used to explain an example of UV light output according to the second embodiment, FIG. 17A showing a graph of the output of the fifth photodiode A3, FIG. 17B showing a graph of the output of the sixth photodiode B3 and FIG. 17C showing a graph when the output of the sixth photodiode B3 is subtracted from the output of the fifth photodiode A3 (i.e., output of a fifth photodiode A3−output of a sixth photodiode B3).
Figure 17B:
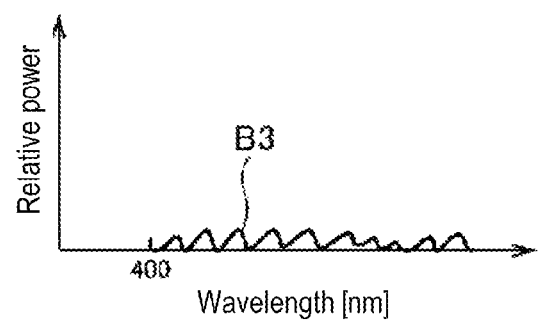
Figure 17C:
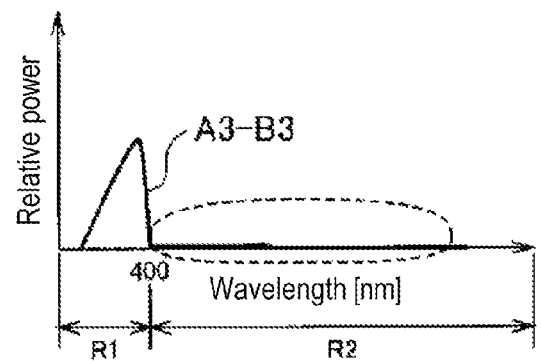

FIG. 17A shows a graph of the output of the fifth photodiode A3. FIG. 17B shows a graph of the output of the sixth photodiode B3. FIG. 17C shows a graph when the output of the sixth photodiode B3 is subtracted from the output of the fifth photodiode A3 (i.e., output of the fifth photodiode A3−output of the sixth photodiode B3). From comparison between ranges surrounded by broken lines in FIGS. 17A and 17C, it can be seen that ringing in the visible wavelength range R2 is reduced.

As described above, in this embodiment, (output of the fifth photodiode A3−output of the sixth photodiode B3) is calculated. In other words, a sensitivity deviation which may be caused when the first UV transmission filter f2a is used for the fifth photodiode A3 is corrected based on a sensitivity deviation which may be caused when the second UV transmission filter f2b is used for the sixth photodiode B3. This configuration can obtain the same effects as the first embodiment.

Third Embodiment

An optical sensor according to a third embodiment will now be described with reference to FIGS. 18 to 20 with an emphasis placed on differences from the first embodiment.

An output circuit 1 according to the third embodiment includes an ADC 21 configured to convert an analog signal into a digital signal, an ADC 22 configured to convert an analog signal into a digital signal, and a logic circuit 31 which is configured to perform a calculation to correct a sensitivity deviation, which may be caused when the first UV cut filter f1a is used for the first photodiode A1, based on a sensitivity deviation, which may be caused when the second UV cut filter f1b is used for the second photodiode B1 by subjecting the digital signals from the ADC 21 and the ADC 22 to a predetermined calculation process.

More specifically, the output circuit 1 includes an ADC 21 which is connected to a first photodiode A1, a second photodiode B1 having characteristics different from those of the first photodiode A1, first and second UV cut filters f1a and f1b, a third photodiode A2 having the same configuration as the first photodiode A1 and including the first UV cut filter f1a formed on its light receiving surface, and a fourth photodiode B2 having the same configuration as the second photodiode B1 and including the second UV cut filter f1b formed on its light receiving surface and converts [(output of the first photodiode A1−output of the third photodiode A2)+(output of the fourth photodiode B2+output of the second photodiode B1)] from an analog signal into a digital signal, an ADC 22 which is connected to the second photodiode B1 and converts (output of the second photodiode B1+output of the second photodiode B1) from an analog signal into a digital signal, and a logic circuit 31 which calculates [(output of the first photodiode A1−output of the third photodiode A2)−(output of the second photodiode B1−output of the fourth photodiode B2)] by subjecting the digital signals from the ADC 21 and the ADC 22 to a predetermined calculation process.

(Example of Configuration of Output Circuit)

Figure 18:
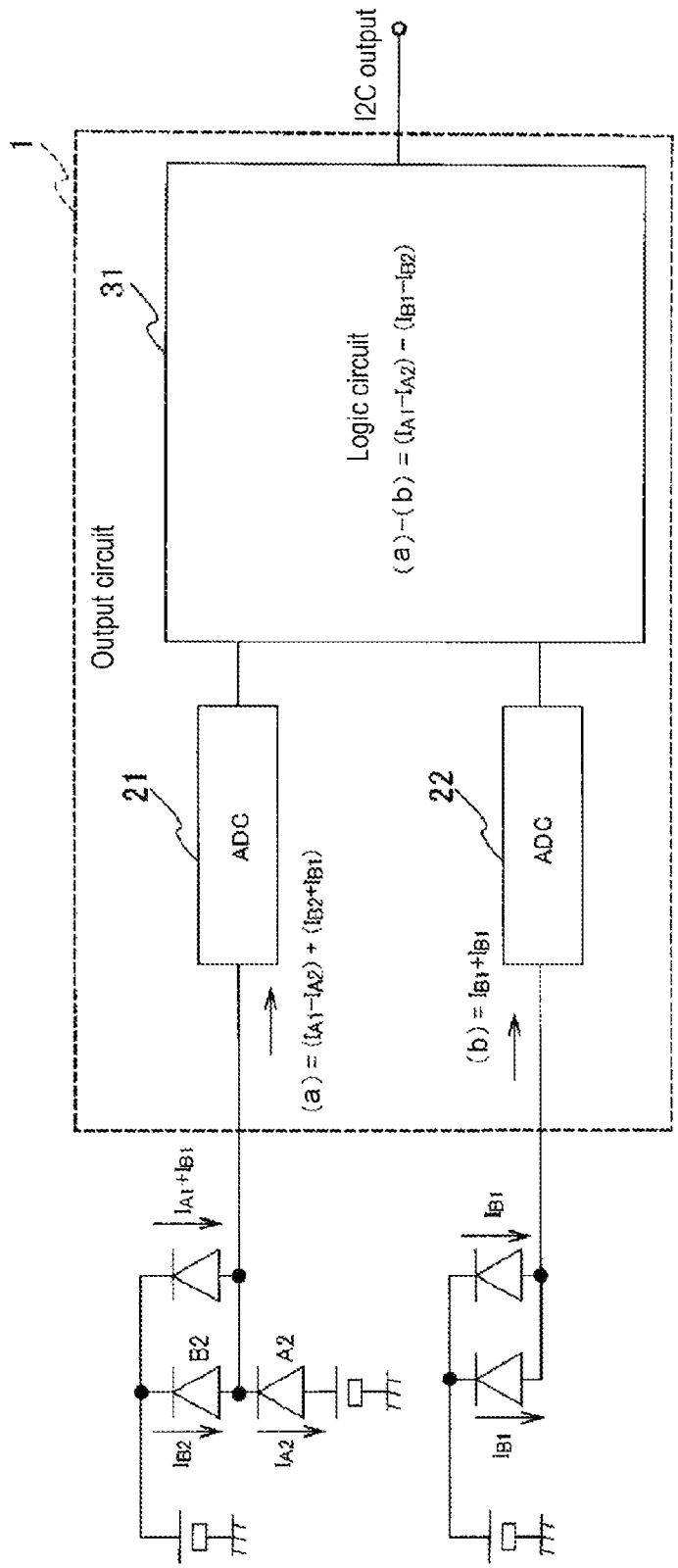
FIG. 18 is a schematic block diagram showing an example of a configuration of an output circuit according to a third embodiment.
Figure 19:
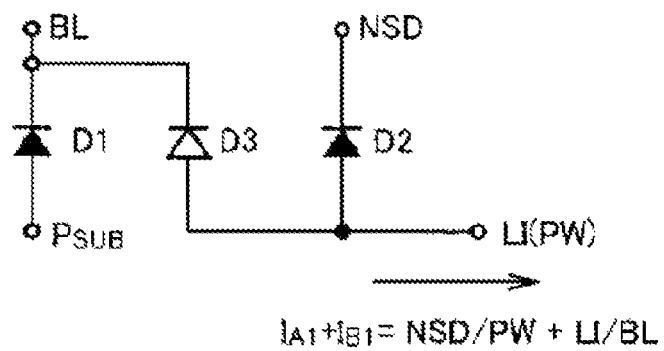
FIG. 19 is a schematic circuit diagram of photodiodes according to the third embodiment, showing extraction of current ($I_{A1}+I_{B1}$).

FIG. 18 is a schematic block diagram showing an example of a configuration of the output circuit 1 according to the third embodiment. The output circuit 1 according to the third embodiment is different from the first embodiment (FIG. 1) in that the former does not include the arithmetic circuit 10. This output circuit 1 is configured in such a manner that outputs of two combinations of the photodiodes are processed by the ADCs 21 and 22, respectively, to obtain the same output as the first embodiment by subjecting the digital signals to a predetermined calculation process by means of the logic circuit 31.

More specifically, as shown in FIG. 18, a current value (a) $(=(I_{A1}-I_{A2})+(I_{B2}+I_{B1}))$ is input to the ADC 21 and a current value (b) $(=I_{B1}+I_{B1})$ is input to the ADC 22. When these current values (a and b) are input to the logic circuit 31, the logic circuit 31 calculates ((a)−(b)) (i.e., $((I_{A1}-I_{A2})-(I_{B1}-I_{B2}))$). Subscripts A and B denote outputs of the first UV cut filter f1a and the second UV cut filter f1b, respectively.

Figure 20A:
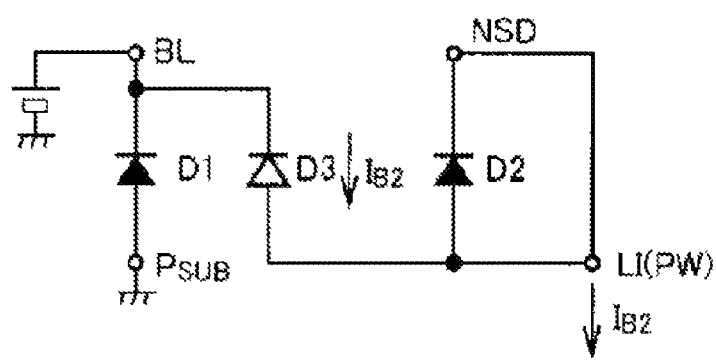
FIGS. 20A to 20D are schematic circuit diagrams of the photodiodes according to the third embodiment, FIG. 20A showing extraction of current $I_{B2}$.
Figure 20B:
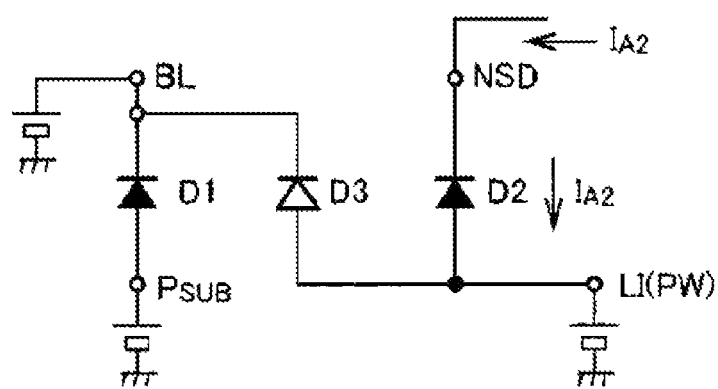
Figure 20C:
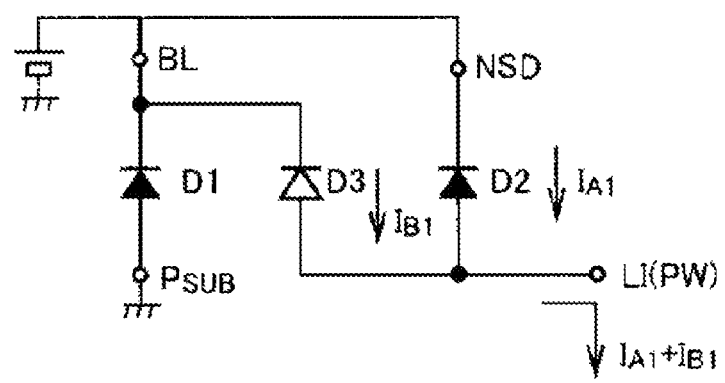
Figure 20D:
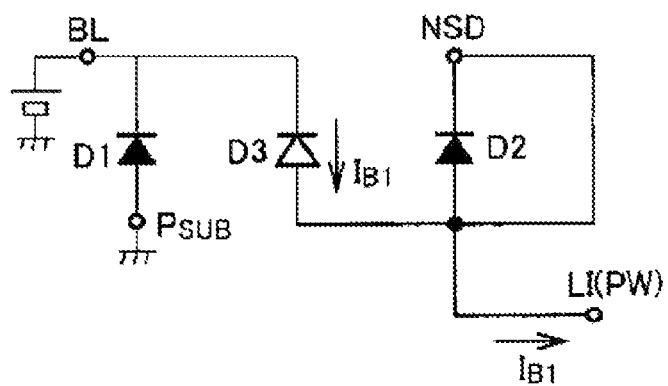
Figure 21A:
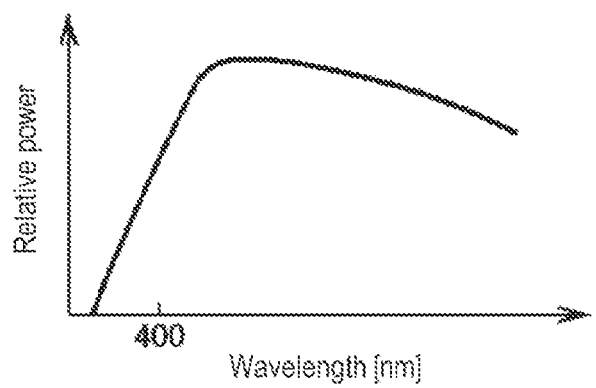
FIGS. 21A and 21B are graphical views used to explain problems in the related art, FIG. 21A showing a sunlight spectrum and FIG. 21B showing extraction of an UV wavelength range of the light.
Figure 21B:
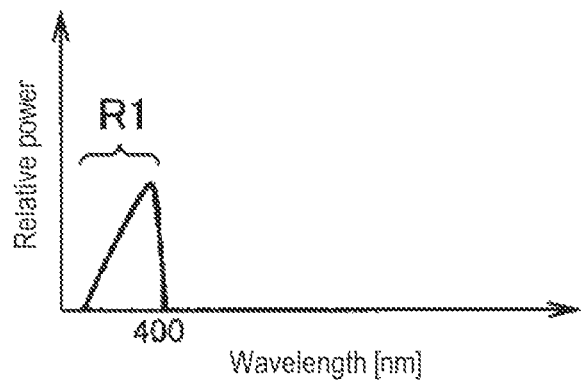
Figure 22A:
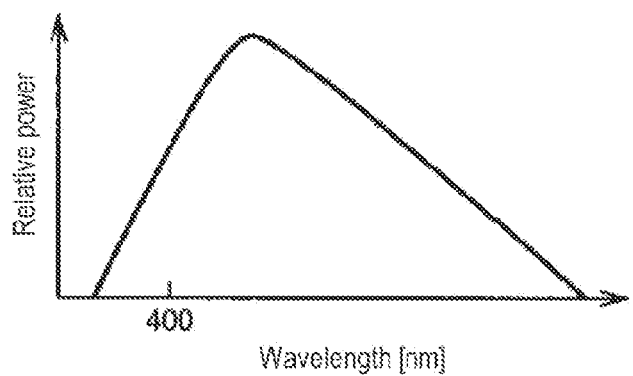
FIGS. 22A, 22B, and 22C are graphical views used to explain problems in the related art, FIG. 22A showing an output of a photodiode provided with no filter, FIG. 22B showing an output of a photodiode provided with a filter, and FIG. 22C showing subtraction of the output of the photodiode A2 from the output of the photodiode A1.
Figure 22B:
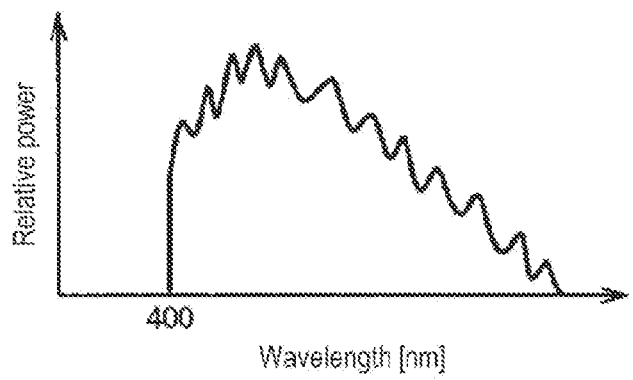
Figure 22C:
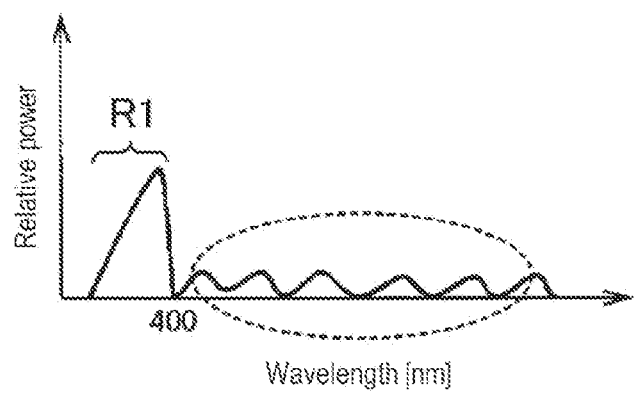
Figure 23A:
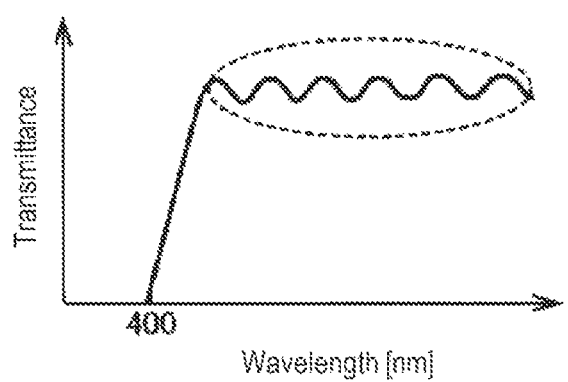
FIGS. 23A and 23B are views used to explain problems in the related art, FIG. 23A being a graphical view showing characteristics of an UV cut filter and FIG. 23B being a view used to explain ringing.
Figure 23B:
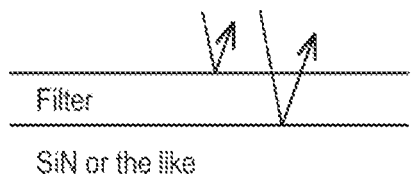

A method of extracting the above-mentioned currents will be described below with reference to FIG. 20. FIG. 20A shows an extraction of the current $I_{B2}$, i.e., the extraction of the filter presence of the second UV cut filter f1b. FIG. 20B shows an extraction of the current $I_{A2}$, i.e., the extraction of the filter presence of the first UV cut filter f1a. FIG. 20C shows an extraction of the current $I_{A1}+I_{B1}$, i.e., the extraction of the filter absence of the first UV cut filter f1a+filter absence of the second UV cut filter f1b. FIG. 20D shows an extraction of the current $I_{B1}$, i.e., the extraction of the filter absence of the second UV cut filter f1b. It is possible to extract the currents by changing a connection method of the photodiodes D1 to D3 in this manner.

As described above, in this embodiment, since no arithmetic circuit (analog circuit) 10 is used, it is possible to eliminate errors due to the analog circuit (for example, leak current, a delay due to parasitic capacitance of a current mirror, a low current mirror precision and so on). In addition, when the ADCs 21 and 22 have the same configuration, precision can be improved since manufacture variations of the ADCs 21 and 22 can cancel each other. In addition, when the integral time of the ADCs 21 and 22 is changed, it is possible to perform a trimming process for final outputs. In addition, an adjustment process can be easily performed with only change in the integral time. Although the third embodiment has been described with an emphasis placed on differences from the first embodiment, the second embodiment may not employ the arithmetic circuit 10 as well.

As apparent from the above description, the present disclosure can provide an optical sensor and an output circuit 1 thereof, which are capable of achieving high precision by reducing a sensitivity deviation due to ringing.

Other Embodiments

Although the present disclosure has been described in the above by ways of the first to third embodiments, it is to be understood that the description and drawings constituting parts of the present disclosure are merely illustrative but not limiting. Various alternative embodiments, examples and operation techniques will be apparent to those skilled in the art when reading from the above description and the drawings.

Thus, the present disclosure is intended to encompass different embodiments which are not described herein. For example, while the optical sensors extracting only the UV light have been illustrated in the first to third embodiments, it is to be understood that other optical sensors extracting light in a wavelength range other than the UV wavelength range can be encompassed in the scope of the present disclosure.

INDUSTRIAL APPLICABILITY

The optical sensors and the output circuits thereof according to the present disclosure can be applied to various electronic devices including an UV meter, an illuminometer, a smart phone, a tablet and so on.

According to the present disclosure in some embodiments, it is possible to provide an optical sensor and an output circuit thereof, which are capable of achieving high precision by reducing a sensitivity deviation due to ringing.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An optical sensor comprising:
   a first photodiode;
   a second photodiode having characteristics different from characteristics of the first photodiode;
   first and second cut filters configured to block a specific wavelength range of the light;
   a third photodiode configured to include the same configuration as the first photodiode, the third photodiode further configured to include the first cut filter formed on a light receiving surface of the third photodiode;
   a fourth photodiode configured to include the same configuration as the second photodiode, the fourth photodiode further configured to include the second cut filter formed on a light receiving surface of the fourth photodiode; and
   an output circuit including:
      a first transistor having a collector connected to a cathode of the first photodiode;
      a second transistor having a collector connected to an anode of the second photodiode;
      a third transistor having a collector connected to a cathode of the third photodiode, the first and third transistors having a common base which is connected to the collector of the first transistor; and
      a fourth transistor having a collector connected to an anode of the fourth photodiode, the second and fourth transistors having a common base which is connected to the collector of the second transistor,
   wherein the output circuit is operable to calculate an equation of [(output of the first photodiode−output of the third photodiode)−(output of the second photodiode−output of the fourth photodiode)] using current values at the collector of the third transistor and at the collector of the fourth transistor, and
   wherein a sensitivity of the second photodiode for the specific wavelength range is lower than a sensitivity of the first photodiode for the specific wavelength range.

2. The optical sensor of claim 1, wherein the specific wavelength range is an UV wavelength range.

3. The optical sensor of claim 1, wherein, when the equation of [(output of the first photodiode−output of the third photodiode)−(output of the second photodiode−output of the fourth photodiode)] is calculated, areas of the first to fourth photodiodes are adjusted in advance such that a value of current in a wavelength range other than the specific wavelength range becomes zero.

4. The optical sensor of claim 1, wherein, when the equation of [(output of the first photodiode−output of the third photodiode)−(output of the second photodiode−output of the fourth photodiode)] is calculated, a calculation method in the output circuit is adjusted in advance such that a value of current in a wavelength range other than the specific wavelength range becomes zero.

5. The optical sensor of claim 1, wherein each of the first and second cut filters is a multi-layered film including $SiO_2$ and $TiO_2$.

6. An output circuit comprising:
   an arithmetic circuit which is connected to a first photodiode, a second photodiode having characteristics different from characteristics of the first photodiode, first and second cut filters configured to block a specific wavelength range of the light, a third photodiode having the same configuration as the first photodiode and including the first cut filter formed on a light receiving surface of the third photodiode, and a fourth photodiode having the same configuration as the second photodiode and including the second cut filter formed on a light receiving surface of the fourth photodiode, and calculates an equation of [(output of the first photodiode−output of the third photodiode)−(output of the second photodiode−output of the fourth photodiode)];
   a conversion circuit configured to convert an analog signal from the arithmetic circuit into a digital signal; and
   a logic circuit which configured to subject the digital signal from the conversion circuit to a predetermined calculation process,
   wherein a sensitivity of the second photodiode for the specific wavelength range is lower than a sensitivity of the first photodiode for the specific wavelength range,
   wherein the arithmetic circuit includes:
      a first transistor having a collector connected to a cathode of the first photodiode;
      a second transistor having a collector connected to an anode of the second photodiode;
      a third transistor having a collector connected to a cathode of the third photodiode, the first and third transistors having a common base which is connected to the collector of the first transistor; and
      a fourth transistor having a collector connected to an anode of the fourth photodiode, the second and fourth transistors having a common base which is connected to the collector of the second transistor, and
   wherein the arithmetic circuit calculates the equation of [(output of the first photodiode−output of the third photodiode)−(output of the second photodiode−output of the fourth photodiode)] using current values at the collector of the third transistor and at the collector of the fourth transistor.

7. The output circuit of claim 6, wherein the specific wavelength range is an UV wavelength range.

8. The output circuit of claim 6, wherein, when the equation of [(output of the first photodiode−output of the third photodiode)−(output of the second photodiode−output of the fourth photodiode)] is calculated, areas of the first to fourth photodiodes are adjusted in advance such that a value of current in a wavelength range other than the specific wavelength range becomes zero.

9. The output circuit of claim 6, wherein, when the equation of [(output of the first photodiode−output of the third photodiode)−(output of the second photodiode−output of the fourth photodiode)] is calculated, a calculation method is adjusted in advance such that a value of current in a wavelength range other than the specific wavelength range becomes zero.

10. The output circuit of claim 6, wherein each of the first and second cut filters is a multi-layered film including $SiO_2$ and $TiO_2$.

* * * * *